(12) United States Patent
Vona

(10) Patent No.: US 11,556,839 B1
(45) Date of Patent: Jan. 17, 2023

(54) AUDITING SYSTEM FOR MACHINE LEARNING DECISION SYSTEM

(71) Applicant: Amazon Technologies, Inc., Seattle, WA (US)

(72) Inventor: Geoffrey Alan James Vona, Etobicoke (CA)

(73) Assignee: Amazon Technologies, Inc., Seattle, WA (US)

( * ) Notice: Subject to any disclaimer, the term of this patent is extended or adjusted under 35 U.S.C. 154(b) by 1039 days.

(21) Appl. No.: 16/248,696

(22) Filed: Jan. 15, 2019

(51) Int. Cl.
*G06F 21/00* (2013.01)
*G06N 20/00* (2019.01)
*G06F 16/23* (2019.01)
*G06N 5/02* (2006.01)

(52) U.S. Cl.
CPC ......... *G06N 20/00* (2019.01); *G06F 16/2365* (2019.01); *G06N 5/02* (2013.01)

(58) Field of Classification Search
CPC ....... G06N 20/00; G06N 5/02; G06F 16/2365
See application file for complete search history.

(56) References Cited

U.S. PATENT DOCUMENTS

| | | | |
|---|---|---|---|
| 9,594,905 B1 | 3/2017 | Ismael et al. | |
| 10,095,869 B2 | 10/2018 | Childress et al. | |
| 10,599,984 B1 * | 3/2020 | Wubbels | ................ G16H 50/20 |
| 10,810,512 B1 * | 10/2020 | Wubbels | ................ G16H 50/20 |
| 11,055,727 B1 * | 7/2021 | Kumar | ................ H04L 63/1408 |
| 2008/0082968 A1 | 4/2008 | Chang et al. | |
| 2013/0097706 A1 | 4/2013 | Titonis et al. | |
| 2017/0083626 A1 * | 3/2017 | Kensel | ................ G06F 16/9577 |
| 2019/0102670 A1 * | 4/2019 | Ceulemans | .............. G06N 3/04 |

FOREIGN PATENT DOCUMENTS

WO   WO-2010150008 A2 * 12/2010 ........... G06F 21/602

* cited by examiner

*Primary Examiner* — Mahfuzur Rahman
(74) *Attorney, Agent, or Firm* — Robert C. Kowert; Kowert, Hood, Munyon, Rankin & Goetzel, P.C.

(57) ABSTRACT

Computer systems and associated methods are disclosed to implement a decision model auditing system that allows clients of a machine learning decision system to audit the decision-making process the decision system. In embodiments, the decision system is instrumented with reporting code to collect internal decision data of the decision system and send the data to a decision auditing service. In embodiments, the auditing service provides the client with an obfuscated token, which may be used to anonymize the client requests to the decision system. As client requests are handled by the decision system, the reporting code generates audit messages to the auditing service. The auditing service stores the audit information, which may later be provided to the client or used generate an audit report. In embodiments, the audit report may indicate whether the decision system contains any undesired bias.

20 Claims, 10 Drawing Sheets

AUDITING SYSTEM FOR MACHINE LEARNING DECISION SYSTEM

BACKGROUND

Computerized decision-making systems have become increasingly important in recent times. For example, such systems are increasingly being used to make machine-learned decisions in applications such as online marketing and content selection, system optimization, medical research, and other types of adaptive machine learning systems. For example, in a content selection system, the decision system may use a machine learned model to recommend content based on user requests, aiming to maximize the relevance of the selections. In some cases, such decision systems may continue to evolve based on user feedback, in order to learn the preferences of the user.

In traditional coded applications, when business logic was embedded in code, the code can be readily inspected by a third party during an audit process. For example, a third party can inspect the application code to verify that the code is correct with respect to a set of test conditions, or to determine whether the code contains any undesirable bias. This is because in coded applications, an articulation of the functioning of the application is specified in a rules-based system that encodes business logic in a human readable form. However, machine learning systems obfuscate this business logic in machine-learned models, making it largely opaque to human inspection. For example, it is difficult to inspect each model to get a clear understanding of how the model reacts to all inputs. Moreover, it is often beneficial to have independent third parties perform audits for various reasons. There is a general need in the field for more practical solutions to audit machine learning systems and to safeguard the auditing process against problems such as tampering.

Figure 1:
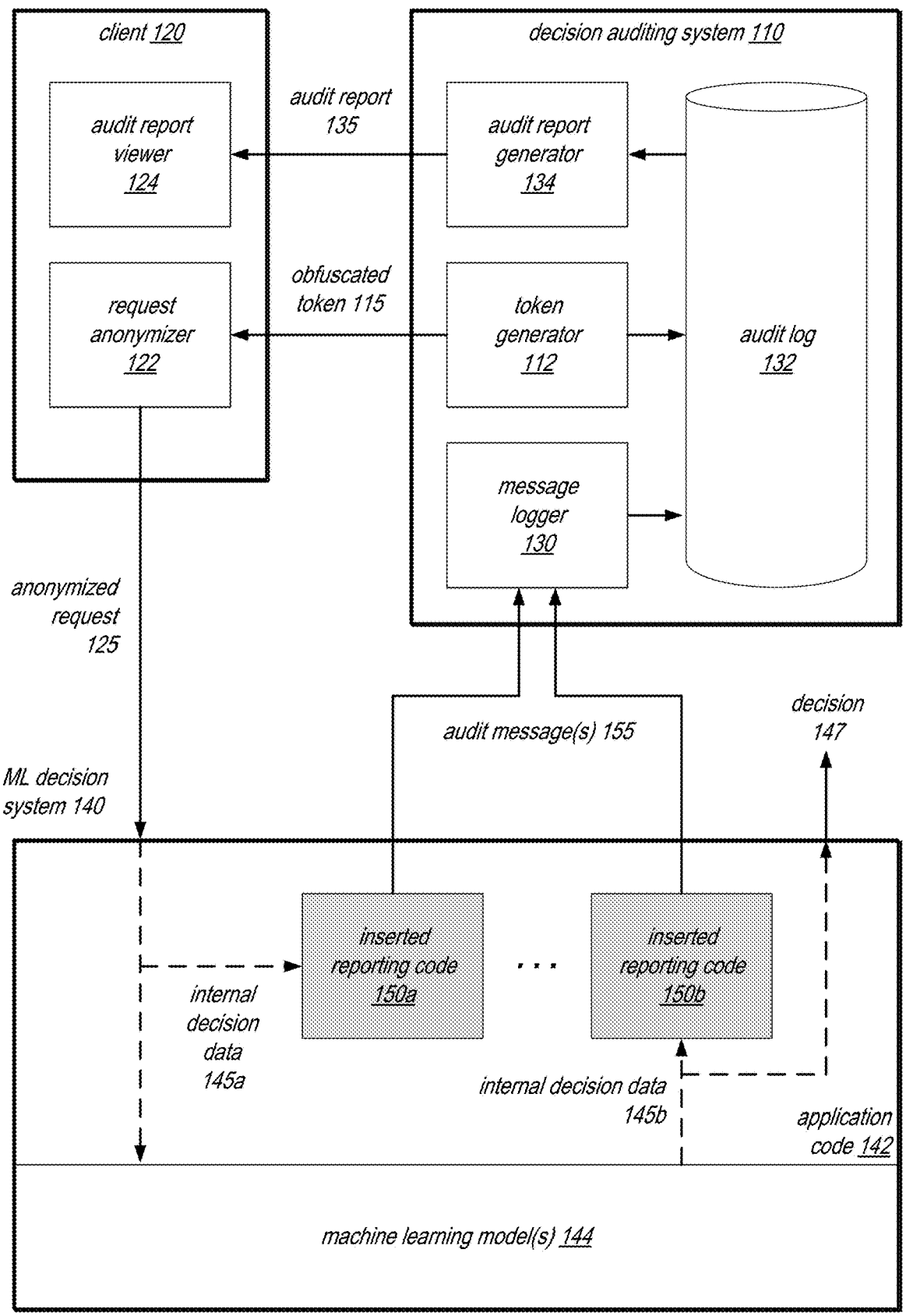
FIG. 1 is a block diagram illustrating an example decision auditing system for machine learning decision systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a decision auditing system for machine learning (ML) decision systems, according to some embodiments.

Machine-learned decision-making systems have become increasingly important in recent times. For example, such systems are increasingly being used to make machine-learned decisions in applications such as online marketing and content selection, system optimization, medical research, and other types of adaptive machine learning systems. In traditional coded applications, when business logic was embedded in code, the code can be readily inspected by a third party during an audit process, for example, to verify that the code is correct with respect to a set of test conditions, or to determine whether the code contains any undesirable bias. However, auditing of machine learning systems is difficult to perform because machine learning systems generally obfuscate its business logic in machine learning models, making it largely opaque to human inspection. Moreover, it is beneficial to use independent third-party auditors for various reasons, such as having the auditors evaluate the systems with a fresh set of eyes, instead of possibly being constrained by what went into building the system.

Accordingly, the present disclosure describes embodiments of a decision auditing system that can be used to easily audit the decision-making process of ML decision systems, improving upon conventional computer systems that are used to perform such auditing. In some embodiments, the decision auditing system may be implemented as a standalone service. In some embodiments, the decision auditing service may be hosted on a separate infrastructure that is running the ML decision system. In some embodiments, the decision audit service may be run on a common network-accessible system (e.g. a machine learning service) as the ML decision system, but as two separately managed services. In some embodiments, the auditing system or service is built or operated by a different team from the development team for the ML decision system, in order to reduce the risk of any bias that may be injected into the auditing process by the development team. In some embodiments, the auditing system can be inspected using code inspection techniques to ensure that no tampering has occurred.

In some embodiments, the auditing may be performed using calls from the ML decision system to the separate auditing system or service. The calls may be made via reporting code, which may be inserted into the ML decision system via a code instrumentation system. In some embodiments, the decision auditing system may only accept calls from registered reporting sources. The auditing service may log the results of any accepted call along with a timestamp.

In some embodiments, the code instrumentation system may parse the code for the ML decision system to identify various instrumentation points or locations to be instrumented with reporting code. Such locations may include, for example, inbound functions and outbound functions of the ML decision system, various interface functions or data structures to different ML models used by the ML decision system, among other locations. In some embodiments, the instrumentation locations may be specified by an audit team programmer with some assistance from the development team of the ML decision system.

The instrumentation code that is inserted will communicate with the decision auditing service or system. For example, when an instrumented function in the decision system is called, the reporting code in the function may report or send an audit message to the decision auditing service to indicate the input or output values of the call. In some embodiments, the audit message may include all incoming parameters as well as model parameters for the model. In some embodiments, the code instrumentation system will also insert reporting code to communicate with the decision auditing service at multiple decision points of the ML decision system, for example, around an outbound call to an external service, inside the identified outbound call, or at a return point inside an inbound call. In this manner, the code instrumentation system inserts instrumentation that will call the decision auditing service for all inbound requests and outbound results/decisions for the machine learning model. In some embodiments, the instrumentation may be performed programmatically on compiled or intermediate code, such as Java™ bytecode, and not on the source code of the ML decision system. In this manner, the reporting code instrumentation will not require in-depth knowledge or modification of the decision system itself, and the instrumentation process may be performed without adding any unintended bias to the auditing process.

In some embodiments, the decision auditing system may be configured to track and maintain client information without revealing this information to the ML decision system. In some embodiments, a client that makes a request to the ML decision system may use a client-side library or module to generate an obfuscated token. The obfuscated token may be used as a client identifier in the client request to anonymize the request to the ML decision system. In some embodiments, the client may send its client identifier to the decision auditing service, which will generate the obfuscated token based on the client identifier. In some embodiments, the obfuscated token may be generated based on the client identifier and the timestamp of the generation. In some embodiments, the obfuscated token may be passed through to the decision system as an additional parameter of the client request. For example, where the request is a REST (Representational State Transfer) call, the obfuscated token may be specified as a named HTTP POST parameter.

In some embodiments, the inserted reporting code may recognize the obfuscated token in the client requests, and include the token in all audit messages reported back to the decision auditing system. In some embodiments, the decision auditing system may track clients that are performing an audit of the ML decision system via the obfuscated tokens. For example, the auditing system may store received auditing information organized according to their respective obfuscated tokens. In some embodiments, the auditing system may decode the obfuscated token to obtain the client identifier, and store the auditing information organized according to the client identifier. In some embodiments, the auditing system may restrict access to the auditing information to the client that generated the auditing information. However, because client identifier is never seen by the ML decision system, the decision system never learns the identity of the client that issued the requests being processed.

In some embodiments, the decision auditing system or service may also provide a user interface, such as a graphical user interface (GUI) to provide collected auditing information about the decisions made by the ML decision system. In some embodiments, the GUI may display, for a particular request that was audited, the collected decision data that were used to make the decision. Such decision data may include for example, any input parameters of the request, any output or intermediate results for the request, or input or output data used by the ML model. In some embodiments, the audit information may include model state data of the ML model, which in some embodiments may change over time. In some embodiments, the audit information may also include any contextual data, for example, the historical behavior of a client that is tracked by the ML model.

In some embodiments, the GUI may also be configured to collect audit information to generate a decision graph, which displays the various decisions steps that were taken by the ML decision system to arrive at the ultimate decision. For example, in some embodiments, the ML decision system may issue a number of function calls or use a number of sub-models to determine a number of sub-results that are used internally. These internal calls and sub-results may be captured by the reporting code and reported or sent back to the auditing service, so that they can be displayed to the client as part of the audit results. In some embodiments, the GUI of the auditing system may also be configured to compare auditing information of different requests. For example, in some embodiments, the GUI may display the audit results of one audited request side-by-side with the audit results of another request. In some embodiments, the GUI may be configured to compare the aggregate audit results of groups of requests.

A number of technical advantages of the disclosed auditing system will be apparent to those of skill in the art. For example, in one respect, the decision auditing system cleanly separates the auditing process from the decision system's development process. This separation eases the burden of the development team, and also eliminates the development team as a possible source of errors in the auditing process.

In another respect, by using the obfuscated token to anonymize client requests, no client-identifying information is made available to the ML decision system at any time, so that the system's decision is made independent from the client's identity. This eliminates the question of whether the decision system is biased based on the client's identity, which is a question that arises frequently for certain types of ML decision systems that are used by many different clients.

In another respect, the audit messages from the decision system may be logged on a per-client basis. This allows the audit results to be stored and later accessed based on their respective client identifiers, and access restrictions to be enforced on the stored audit results.

In another respect, the code instrumentation is performed largely mechanically using code instrumentation system, so that there is little risk of altering the behavior of the decision system itself. In some embodiments, the code instrumentation system itself can be audited to ensure that the instrumentation process did not inappropriately tamper with the decision system or bias the audit process.

In another respect, by properly identifying the inbound and outbound calls to the decision system for reporting code instrumentation, the instrumentation can work for synchronous and asynchronous systems. For example, in some embodiments where the decision system can perform certain tasks in a multithreaded fashion, the reporting code may take measures to separately store audit data using thread-local data structures, and generate audit messages that identify the individual thread. Such information will allow the audit system to later attribute the audit information to the correct request or client, to reconstruct the decision process of the ML decision system.

In yet another respect, the disclosed GUI of the auditing system improves upon prior audit result viewing interfaces to allow users to decompose the decision system's decision process and compare the internal decision data of different decisions. For example, using the GUI, the user may be able to quickly detect that the ML decision model is incorrectly basing its decision on a particular input parameter or subdecision result. The system allows the user to run experiments to vary the input parameters to detect system bias and better understand the source of any bias. Accordingly, the disclosed GUI speeds up the conventional process of detecting and diagnosing hidden biases in ML decision systems. These and other features and benefits of the inventive system and method are described in more detail in the specification below, in connections with the figures.

FIG. 1 is a block diagram illustrating an example decision auditing system for machine learning decision systems, according to some embodiments. As shown, the decision auditing system 110 may be configured to interact with a client 120, and a ML decision system 140 which can be audited. In some embodiments, the client 120, decision auditing system 110, ML decision system 140 may be hosted on one or more respective computer systems, such as the computer system illustrated in FIG. 10.

As shown, the client 120 may be configured to send requests 125 to the ML decision system 140, which may in turn generate a decision 147 corresponding to the request. As shown, the ML decision system 140 is a machine learning system that employs one or more machine learning models 144 to make its decisions 147. As one example, a model may be used to select songs for individual users, and the request may include input data such as the time of day, the type of song, and a reference to one or more characteristics of the user (with user permission), such as the user's recent selection history, etc. As another example, the model 144 may be configured to making driving decisions in a self-driving car, for example, based on various input such as the car's camera feed and the driver's behavior, etc.

As discussed, in many situations, it is desirable to obtain decision auditing information for the ML decision system 140, in order for testers and developers to audit the system against certain types of test conditions and gain a better understanding of the system's decision process. However, it is generally difficult to perform such audits because unlike coded systems, the ML decisions system 140 codifies its behavior in a model 144, which cannot be easily analyzed like programmed code.

Depending on the application, computer models may be represented and stored in a variety of ways. In some embodiments, the model may be stored as a data structure that can be easily used by the computer to generate decision output. For example, in some cases, a model may be represented as a vector or a matrix of parameter values. The parameter values may be values that are used in the decision-making process itself, or other metadata used for other purposes. For example, in some cases the model parameters may include one or more values indicating a current confidence level or bound of the model. In some cases, a model may include memory units that store the ongoing state of the modeled subject or values derived from past inputs or outputs. In some cases, computer models may be stored as more complex data structures that specify relationships between the different parameters, such as trees, graphs, neural networks, or the like. In some cases, a model may include a combination of different types of data structures. In some cases, the structure of these models may change over time. In some cases, a model may be embedded as part of a computer-executable program or a set of hardware circuits, which may expose configurable model parameters, and be executed to carry out the decision-making functions of the decision system.

To audit the ML decision system 140, in some embodiments, the client 120 may be configured to send anonymized requests 125 to the decision system. The request 125 may cause internal decision data 145 to be used or generated within the decision system 140, which ultimately results in the decision 147. In some embodiments, the client may anonymize a request to be audited using a request anonymizer 122, as shown. The request anonymizer 122 may anonymize the request 125 so that the ML decision system 140 does not receive any explicit identifying information about the client 120. In this way, any decisions 147 that are generated by the decision system are not biased based on the client identity. In some contexts, this is a frequently raised question that is difficult to affirm or deny, due to the modeled nature of the decision system. For example, it may be sometimes alleged that a ML decision system that is selecting songs for a user may be performing the selection based on an incorrect reliance on a particular user characteristic. However, by anonymizing the requests to the decision system, the collected audit information is guaranteed to be free of any reliance. Moreover, in some cases, the auditing process may be designed to submit requests with particular client identifiers, in order to specifically test for this type of client-specific bias.

In some embodiments, the request anonymizer may be a client library or component that is incorporated (statically or dynamically) into the executable code of the client 120. In some embodiments, the client software may be instrumented with the request anonymizer functionality. In some embodiments, the request anonymizer may be a separately running executable, or an ongoing service running on the client 120. In some embodiments, the request anonymizer may request an obfuscated token from the decision auditing system 110 to anonymize the request. In some embodiments, the client itself may generate the obfuscated token without or with only occasional input from the decision auditing system 110.

In some embodiments, to anonymize the request 125, the request anonymizer may obtain a token 115 from the decision auditing system 110. In some embodiments, as shown, the decision auditing system 110 may generate an obfuscated token 115 to be used as a client identifier or request identifier for the request 125. In some embodiments, each request sent by the client 120 may specify a different token as the request identifier. In some embodiments, the token generator 112 in the decision auditing system 110 may generate the token based on a submitted client ID and a timestamp. Thus, every time a client submits a request to obtain an obfuscated token, a different token 115 will be generated and provided. In some embodiments, the token generator 112 may then store audit information in an audit log 132 according to the generated token. In some embodiments, all audit information collected from the ML decision system 140 are stored in an audit log repository 132, which may be one or more files or databases, depending on the embodiment. In some embodiments, once a token is provided, it is also stored in the audit log repository so that any later received audit information with that token are associated with the token in the audit log 132. In this way, the information in the audit log can be easily fetched by the token (or corresponding client identifier), and an access restriction policy may be implemented so that access to the audit information may be limited based on the associated token (or client identifier).

As shown, once the client 120 obtains the token 115, it may modify the request to include the token instead of its actual client or request identifier. For example, in some embodiments, the request may have a request parameter for specifying the requestor ID. The client may accordingly use the obfuscated token as the requestor ID of the request. In this fashion, the ML decision system 140 may process the request 125 to generate the decision 147 without learning the actual identity of the requestor.

In some embodiments, the request 125 may cause different internal decision data 145a and 145b to be used or generated in the decision system 140. To audit the ML decision system 140, the ML decision system may be instrumented with reporting code, such as reporting code 150a and 150b to collect this internal decision data 145. In some embodiments, the ML decision system 140 may include a portion that is coded with application code layer 142, so that it can be interact with external programmatic components. For example, in some embodiments, the decision system 140 may be wrapped in a Java™ program, which may be used to receive external requests 125 and provide or carry out the generated decisions 147.

In some embodiments, the inserted reporting code 150 may be inserted not as source code, but as compiled or intermediate code. Thus, for example, where the application code is Java, the inserted reporting code 150 may be inserted as Java™ bytecode segments into the Java™ bytecode of the ML decision system 140. In some other embodiments, the types of bytecode or intermediate code may be similarly processed. In some embodiments, this instrumentation process is carried out by a separate team from the development team of the decision system itself. In some embodiments, the instrumentation process may be performed via a largely programmatic or mechanical process, so that the instrumentation team does not need to modify or gain full knowledge the core functional behavior of the decision system. Rather, the reporting code may be simple segments of code that are inserted in select locations in the application code 142, in order to collect internal decision data 145 in the ML decision system 140. As shown, the reporting code 150 may collect such decision data 145, and send the data as audit message 155 to the decision audit system 110.

Depending on the embodiment, a variety of internal decision data 145 may be collected by the reporting code. In some embodiments, input parameters or output parameters of the ML decision system 140 may be collected. In some embodiments, intermediate results (e.g. input or return values of particular internal functions in the decision system) may be collected. In some embodiments, the decision process itself may be segmented into a series of decision steps or sub-decisions, and the results of such decisions steps or sub-decisions may be captured. In some embodiments, the decision may be based on certain context or background data that is not specified as part of the request itself, such as for example the time of day, a requestor's recent history or profile information, the recent behavior of the user population, the state or conditions of the decision system or another system, etc. Accordingly, such information may also be captured as part of the audit information. In some embodiments, the decision model may be composed of a number of sub-models, and all inputs to and output from these sub-models may be collected. In some embodiments, the internal state variables of the models may also be captured. For example, in some embodiments, the decision system may implement an internal API call to dump the state of the machine learning model 144. The reporting code may use the internal API call to record the model state at different points in the decision-making process.

As shown, in some embodiments, the reporting code 150 may send the collected audit information to the decision auditing system 110 using audit messages. In some embodiments, the audit message 155 may include the collected information in an encrypted or compressed format, which may be unencrypted or decompressed at the decision auditing system. In some embodiments, the audit message may specify a sender ID for the message, which may refer to the ML decision system 140 (or an instance thereof), or a particular segment of inserted reporting code 150. In some embodiments, these sender IDs may be registered at the decision auditing system 110, and verified before an audit message is logged by the system 110. In some embodiments, the audit message 155 may also include a timestamp. The timestamp may indicate the time that a reported event is observed in the decision system 140, or when the audit message is generated or sent by the reporting code. In some embodiments, instead of a timestamp, the reporting code may instead generate a unique sequence number. In some embodiments, the audit message 150 also includes the obfuscated token that was provided with the anonymized request 125. In some embodiments, this token may be sent with the audit information and used by the decision auditing system 110 to associated the audit information with the correct client. In some embodiments, any additional payload information of the audit message 155 may not have any specific format. Rather, additional audit data may be stored in any format, and it is up to downstream system-specific viewing or analysis software to parse the audit message payload. For example, in some embodiments, the decision auditing system 110 may be run as the auditing service for a variety of different ML decision systems, which are each generating their own type of auditing information. In some embodiments, the decision auditing system 110 may be configured as a generalized service that can be used to audit all of these different types of ML decision systems.

As shown, in some embodiments, the audit messages 155 may be received by a message logger 130. In some embodiments, the message logger 130 may perform a number of functions to log incoming audit messages to an audit log 132, which may be implemented as a searchable file or database in some embodiments. In some embodiments, the message logger may perform a number of verifications before an audit message is stored. For example, the message logger may verify that the sender or source ID of an audit message is a known sender or source, for example, registered on a source registry maintained by the system 110. In some embodiments, message logger may verify that the obfuscation token included in the audit message matches a known token associated with a known client. In some embodiments, the message logger may decrypt or decompress the audit message, and make sure that the resulting payload is well-formed. In some embodiments, the message logger may decode the obfuscation token to obtain the client identifier associated with the request that generated the audit message. The message logger may then store the audit information in the message with the client identifier in the audit log 132, so that it can be later accessed by the client or another authorized entity.

As shown, in some embodiments, the auditing system 110 may implement an audit report generator 134, which may be configured to provide audit information 135 to the client 120, or another entity. In some embodiments, the audit report generator may access the information stored in the audit log 132 and present one or more user interfaces, such as GUIs, to allow users or remote clients to view, navigate, and analyze the audit information gathered by the reporting code in the decision system. In some embodiments, the user interfaces may be web interfaces, which are generated as webpage data and sent to the client to be rendered and displayed on a web browser. As shown, the client 120 may implement an audit information viewer 124, which may include the web browser. In some embodiments, a different viewer 124 may be implemented, for example, a database access client or a more sophisticated viewing client that may be implemented as part of a client-side decision analysis or testing system. In some embodiments, the client-side viewer 124 may allow the client to log in to the auditing service to retrieve the audit information. Although the audit report viewer 124 is shown in the figure as being part of the client 120, in some embodiments, the audit report viewer 124 may located on a different system that is separate from the client 120 that issued the anonymized requests 125. For example, in some embodiments, the client 120 may be a client device that uses on the ML decision system 140, while the audit report viewer may be a web browser located on a different computer. In some embodiments, the audit report generator 134 may authenticate a data access client before providing the audit information 135 to the data access client.

In some embodiments, either the client-side viewer 124 or the audit report generator 134 may organize or compile the audit information in a particular manner to present the information in a useful or insightful way or facilitate navigation or analysis of the information. For example, in some embodiments, the client may query for the audit information generated by a particular request, and compare that information with the audit information of another request or set of requests. In some embodiments, the information provider 134 may generate a GUI that displays the comparison in a side-by-side manner. Thus, the GUI may display the effects of different input parameters or factors on the ultimate decisions of the system. In some embodiments, the client may experiment with the input parameters or other factors, by issuing a number of artificial requests to the decisions system with slightly varying input conditions. The audit report generator 134 may then be used to display how these variances impacted the system's decisions. Moreover, the decision auditing system may also be used to compare the decisions for a particular request to actual decisions or other requests received by the system. In this manner, the auditing system allows the user to quickly detect whether some hidden bias exists in the decision system, or certain factors are causing its own requests to be mishandled. For example, using a GUI generated by the audit report generator, a user may compare the decision data for his own performance review with the performance reviews of other users, and quickly understand the salient factors that led to the performance score generated by the decision system for this performance data.

In some embodiments, the audit information viewer 124 or provider 134 may generate or display a decision graph, which depicts the various decisions steps that are performed by the decision system in arriving at its decision. In some embodiments, the decision steps may be displayed along with semantically meaningful labels, which may be provided by the decision system itself, the reporting code, or an audit data interpretation module hosted in the auditing system. The decision graph may display a graph showing how certain sub-decision results or input data affect other sub-decisions in the decision system. In some embodiments, the decision graph may display some sub-decision results with a score or confidence value, to indicate the certainty, probability, or strength of the sub-decision, as determined in the decision system. In some embodiments, the decision graph may indicate the duration of time it took the decision system to reach individual sub-decisions, which may be computed based on timestamps provided in the audit messages. In some embodiments, the decision graph of different requests may be compared to see the differences in the respective graphs.

Figure 2:
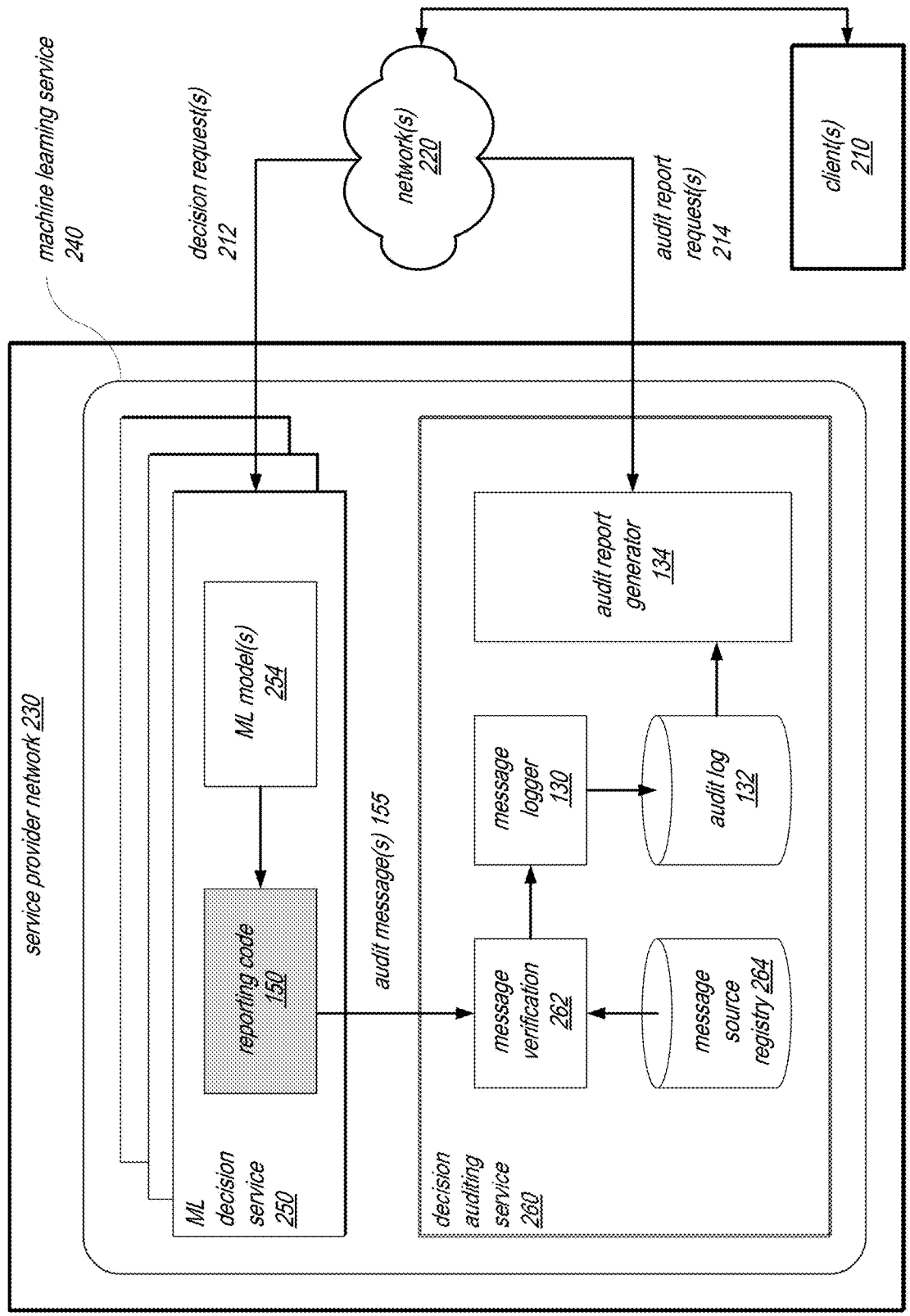
FIG. 2 is a block diagram illustrating an example implementation of a decision auditing system implemented as a service in a service provider network, according to some embodiments.

FIG. 2 is a block diagram illustrating an example implementation of a decision auditing system implemented as a service in a service provider network, according to some embodiments. The system of FIG. 2 represents one example implementation of the system of FIG. 1.

As shown, in the figure, a decision auditing service 260 may be hosted in a service provider network 230, along with a number of different ML decision services 250. In some embodiments, the decision auditing service may be a stand-alone service 260 that implements the decision auditing system 110 of FIG. 1, and the ML decision services 250 may be examples of the ML decision system 140 of FIG. 1. As shown, in some embodiments, some or all of these services may be implemented or hosted on top of a machine learning service 240, which may be responsible for provisioning commodity computing resources for these services. However, in some embodiments, the decision auditing service 260 may execute in a separate execution environment as the ML decision service or system, for example, in a separate cloud attached to the public network. In some embodiments, the decision auditing system 110 may be controlled and operated by a different team of system administrators, so that the developers of a ML decision service are not allowed to influence the auditing of that service. In this manner, any possibility of bias from the ML model's developers may be reduced or avoided altogether.

In some embodiments, the service provider network 230 may provide computing resources to the hosted services 240, 250, and 260. The service provider network 230 may be operated by an entity to provide one or more types of computing resources as services to clients 210, so that the resources may be accessed and used via the Internet and/or other networks 220 to client(s) 210. In some embodiments, the service provider network 230 may implement one or more data centers hosting various resource pools, such as collections of physical servers and/or virtualized compute instances, storage devices, networking equipment and the like, that are needed to implement and distribute the infrastructure and services offered by the provider.

The client(s) 210 may encompass any type of client configurable to submit requests to the service provider network 230. For example, a given client 210 may include a suitable version of a web browser or may include a plug-in module or other type of code module configured to execute as an extension to or within an execution environment provided by a web browser. Alternatively, a client 210 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data.

The client(s) 210 may convey network-based services requests to the service provider network 230 via network 220. In various embodiments, network 220 may encompass any suitable combination of networking hardware and protocols necessary to establish network-based communications between clients 210 and the service provider network 230. For example, a network 220 may generally encompass the various telecommunications networks and service providers that collectively implement the Internet. The network 220 may also include private networks such as local area networks (LANs) or wide area networks (WANs) as well as public or private wireless networks. For example, both a client 210 and the service provider network 230 may be respectively provisioned within enterprises having their own internal networks. In such embodiments, the network 220 may include the hardware (e.g., modems, routers, switches, load balancers, proxy servers, etc.) and software (e.g., protocol stacks, accounting software, firewall/security software, etc.) necessary to establish a networking link between the client 210 and the Internet as well as between the Internet and service provider network 230. In some embodiments, the client(s) 210 may communicate with service provider network 230 using a private network rather than the public Internet.

In some embodiments, the machine learning service 240 (MLS) may implement a set of programmatic interfaces (e.g., APIs, command-line tools, web pages, or standalone GUIs) that can be used by client(s) 210 to submit requests for a variety of machine learning tasks or operations. The machine learning service 240 may include a control plane that comprises a plurality of components (including a request handler, workload distribution strategy selectors, one or more job schedulers, metrics collectors, and modules that act as interfaces with other services). The data plane of the MLS may include, for example, a resource pool, storage devices that are used to store input data sets, intermediate results or final results (some of which may be part of the MLS artifact repository), and the network pathways used for transferring client input data and results.

In some embodiments, a job object submitted to the MLS 240 may indicate one or more operations that are to be performed as a result of the invocation of a programmatic interface, and the scheduling of a given job may in some cases depend upon the successful completion of at least a subset of the operations of an earlier-generated job. In some embodiments, the MLS job queue may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS client). After the processing plan has been generated and the appropriate set of resources to be utilized for the job has been identified, the job's operations may be scheduled on the resources. Results of some jobs may be stored as MLS artifacts within a results repository in some embodiments.

In some embodiments, client requests may result in the immediate generation, retrieval, storage, or modification of corresponding artifacts within MLS artifact repository by the MLS request handler. A client request may also indicate one or more parameters that may be used by the MLS to perform the operations, such as a data source definition, a feature processing transformation recipe, or parameters to be used for a particular machine learning algorithm. In some embodiments, artifacts respectively representing the parameters may also be stored in MLS repository. Some machine learning workflows, which may correspond to a sequence of API requests from a client, may include the extraction and cleansing of input data records from raw data repositories (e.g., repositories indicated in data source definitions) by input record handlers of the MLS.

In some embodiments, the output produced by the input record handlers may be fed to one or more feature processors, where a set of transformation operations may be performed in accordance with recipes using another set of resources from the resource pool. The output of the feature processing transformations may in turn be used as input for a selected machine learning algorithm, which may be executed in accordance with algorithm parameters using yet another set of resources from the resource pool. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

As shown, in the depicted example, the machine learning service 240 is hosting multiple ML decision services 250, which may be configured to make different ML decisions based on decision requests 212. In some embodiments, the decisions may be returned to the clients 210. In some embodiments, the decisions may be used to handle the request without the decisions being returned to the clients 210. As shown, the ML decision service 250 may be instrumented with reporting code 150, as discussed in connection with FIG. 1. The reporting code may be configured to generate audit message to the decision auditing service 260.

As shown, the decision auditing service 260 may use a message logger 130 to log some or all of the received audit messages 155 in an audit log 132. This logging of audit information may be performed in similar fashion as discussed in connection with FIG. 1. Additionally, in some embodiments, the decision auditing service 260 may implement a message verification module 262. In some embodiments, the verification module may be configured to check that an incoming audit message 155 is generated by or sent by a known source. Examples of sources may include for example a particular decision service 250 or a particular segment of reporting code 150. In some embodiments, the audit message 155 may include a field that indicates the message's source or sender ID. The source or sender ID may be generated during a registration process where the reporting code or ML decision service was initially registered with the decision auditing service 260. In some embodiments, registered message sources or senders may be stored in a message source registry 264, as shown. Accordingly, the message verification module 262 may check the sender or source ID of an incoming audit message 255 with the known sender or source IDs in the registry 264 to determine whether the message is from a valid sender or source. In some embodiments, the verification mechanism may be used to guard against a denial of service attack on the decision auditing service 260.

In some embodiments, if the source of the audit message is verified, the contents of the audit message is logged in the audit log repository 132. In some embodiments, as discussed in connection with FIG. 1, the audit report generator 134 may later access the audit log repository 132 to provide audit information back to the clients 210. As shown, in some embodiments, the audit report generator 134 may provide audit information in response to audit report requests 214 from the clients 210. In some embodiments, the access request may be a request to download a particular set of the logged audit information. In some embodiments, the audit report generator may present the information in a GUI, which may in some embodiments include one or more webpages. In some embodiments, the audit report generator 134 may authenticate the client that is requesting access to the audit information before providing the audit information.

Figure 3:
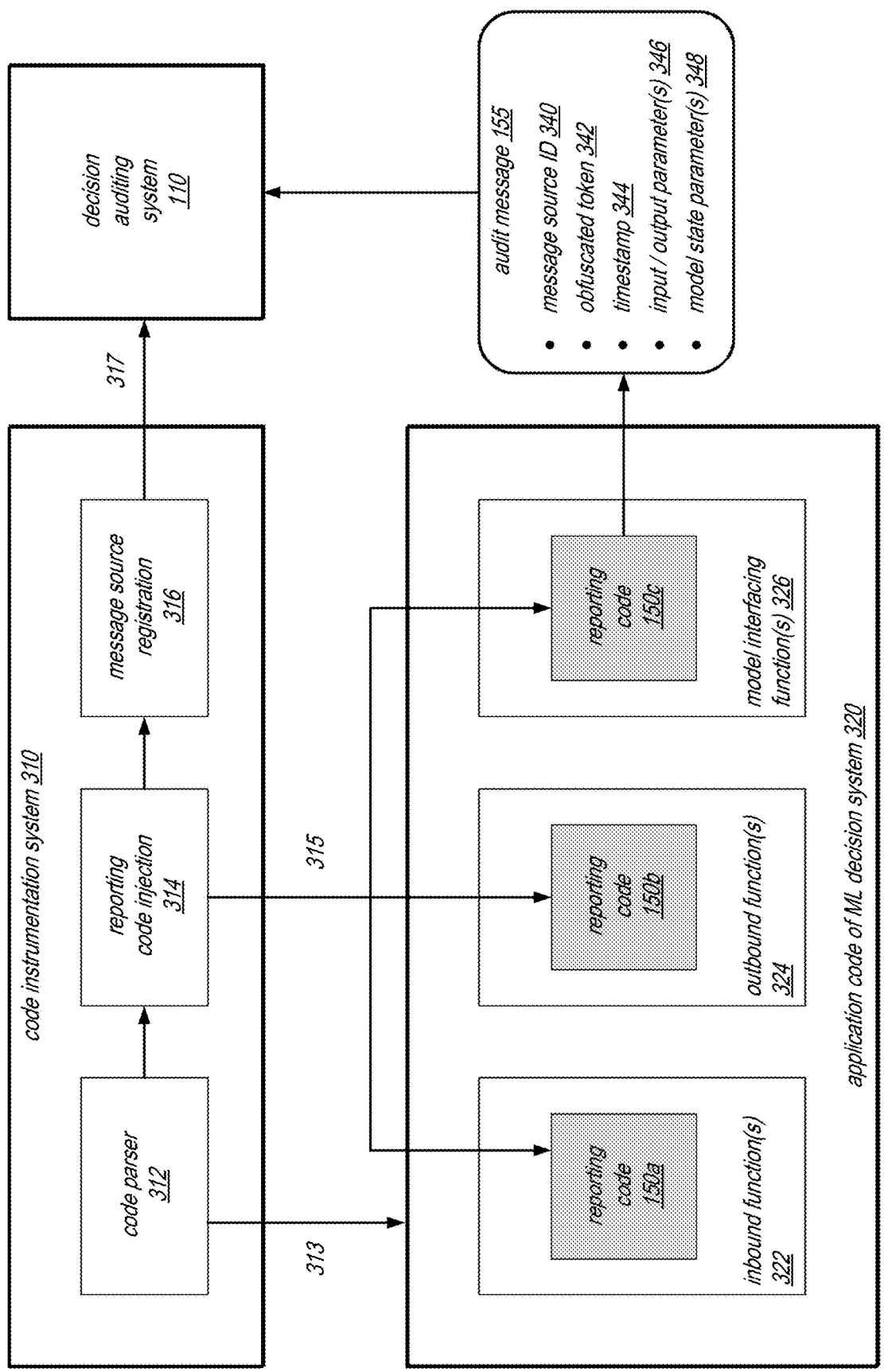
FIG. 3 is a block diagram illustrating an example code instrumentation system that may be used to instrument a machine learning decision system to be audited by a decision auditing system, according to some embodiments.

FIG. 3 is a block diagram illustrating an example code instrumentation system that may be used to instrument a machine learning decision system to be audited by a decision auditing system, according to some embodiments.

As shown, in some embodiments, the inserting of reporting code into the ML decision system (e.g. ML decision system 140 of FIG. 1) may be performed using a code instrumentation system 310. In some embodiments, the code instrumentation system 310 may be a coded system that can be itself be audited, in order to ensure that it does not insert code that changes the intended behavior of the ML decision system. In some embodiments, the instrumentation process may be performed by a software audit team that is independent from the team that developed the ML decision system, so that the auditing process is not biased by the development team. However, in some embodiments, the instrumentation process (e.g. the selection of instrumentation locations) may be performed with information from the development team. In some embodiments, the code instrumentation system 310 may be a fully automated system that can be run without manual input, for example, based on only configuration information. In some embodiments, the code instrumentation system 310 may be implemented as an interactive system that allows a user to manually select code insertion locations and/or reporting code segments, among other things.

As shown, the code instrumentation system 310 may include a code parser 312. In some embodiments, the instrumentation may be performed on application code 320 of the ML decision system. This compiled code may be for example machine executable code or intermediate code generate for further compiling or generate for executing on a virtual machine, such as bytecode executable on the Java™ virtual machine. Accordingly, in some embodiments, the code parser 312 is configured to parse 313 the application code to obtain information about the application code. For example, in some embodiments, the parser 312 may determine the different named functions that are in the application code 320. In some embodiments, the parser 312 may analyze the code to determine all inbound functions 322 and outbound functions 324 in the code, as well as any model interfacing functions 326 that interacts with the ML model in the ML decision system. In some embodiments, the model interfacing functions may include any function that sends data to, receives data from, or modifies the ML model. In some embodiments, the code parser 312 may generate a list of all functions in the application code and also a dependency graph indicating which functions directly call which other functions. Such information may be analyzed by a user to understand the execution flow of the ML decision system and select code insertion locations for the reporting code 150.

As shown, once the application code is parsed, the code instrumentation system 310 may employ a reporting code injection module 314 to inject 315 reporting code 150a-c into the various code insertion locations. As discussed, in some embodiments, the code insertion locations may be determined programmatically by the code instrumentation system itself. In some embodiments, the insertion locations may be manually selected. In some embodiments, the code instrumentation system may recommend one or more code insertion locations, and the user may then approve the recommended locations based on further manual inspection.

In some embodiments, the reporting code injection module 314 may be configured to programmatically select a reporting code segment for a selected insertion location or adapt the reporting code segment to the selected location. In some embodiments, the selection and/or adaptation of the reporting code may be performed in part by a user. For example, in some embodiments, a user may manually specify which local variables are to be included in an audit message to be generated at a particular location. In some embodiments, the user may specify a location-specific message to be included in the audit message. In some embodiments, the reporting code may be configured to contain an execution control mechanism, which may control when the reporting code segment is enabled or disabled. In some embodiments, the reporting code may be configured to sample a subset of requests (e.g., periodically or pseudo-randomly), so that audit information is generated only for the subset of requests. In some embodiments, the code instrumentation system 310 may allow a user may manually modify the reporting code segment 150 directly before the code is inserted.

As shown, in some embodiments, the code instrumentation system 310 may implement a message source registration module 316. The registration module 316 may communicate 317 with the decision auditing system 110, so that the reporting code segments 150a-c or the instrumented ML decision system is registered with the auditing system. In some embodiments, the auditing system 110 may later verify that received audit messages are generated by a registered source before logging the audit message. In some embodiments, the registration module 316 may send a source ID for individual reporting code segments or the instrumented ML decision system, which may be stored at the decision auditing system 110. In some embodiments, the source ID may be generated by the decision auditing system 110 and provided to the message source registration module 316, which may cause the reporting code to be modified to generate the source ID.

As shown, the reporting code 150 may be configured to generate an audit message 155, which may include selection of audit information. In some embodiments, the selection of audit information to be captured may be modified after the reporting code insertion, via for example a runtime configuration parameter. As shown, in some embodiments, the audit message 155 may include a message source ID 340, which may uniquely identify a ML decision system or a reporting code segment. In some embodiments, the audit message may include an obfuscated token 342, which may uniquely identify a request, a client that issued the request, or a particular client session. In some embodiments, the obfuscated token 342 may be the obfuscated token 115 of FIG. 1, which may be used to anonymize the request in the ML decision system. In some embodiments, the audit message may include a timestamp 344, which may correspond to an observed event in the ML decision system or the time when the audit message was generated. In some embodiments, these timestamp values may be used to compute additional audit data, such as for example the time duration that was used to perform certain tasks within the decision process. In some embodiments, the audit message may include an additional payload, whose contents may vary depending on the context of the reporting code. In some embodiments, the audit message may include input or output parameters 346 to an internal function in the decision system or the ML learning model of the system. In some embodiments, the model's output parameters may indicate sub-model results or decisions or confidence metrics for the decisions. In some embodiments, the audit message may include ML model state parameters 348, which may vary as the model evolves over time. Such audit data may all incorporated into one or more audit messages 155, which are delivered to the decision auditing system 110.

Figure 4:
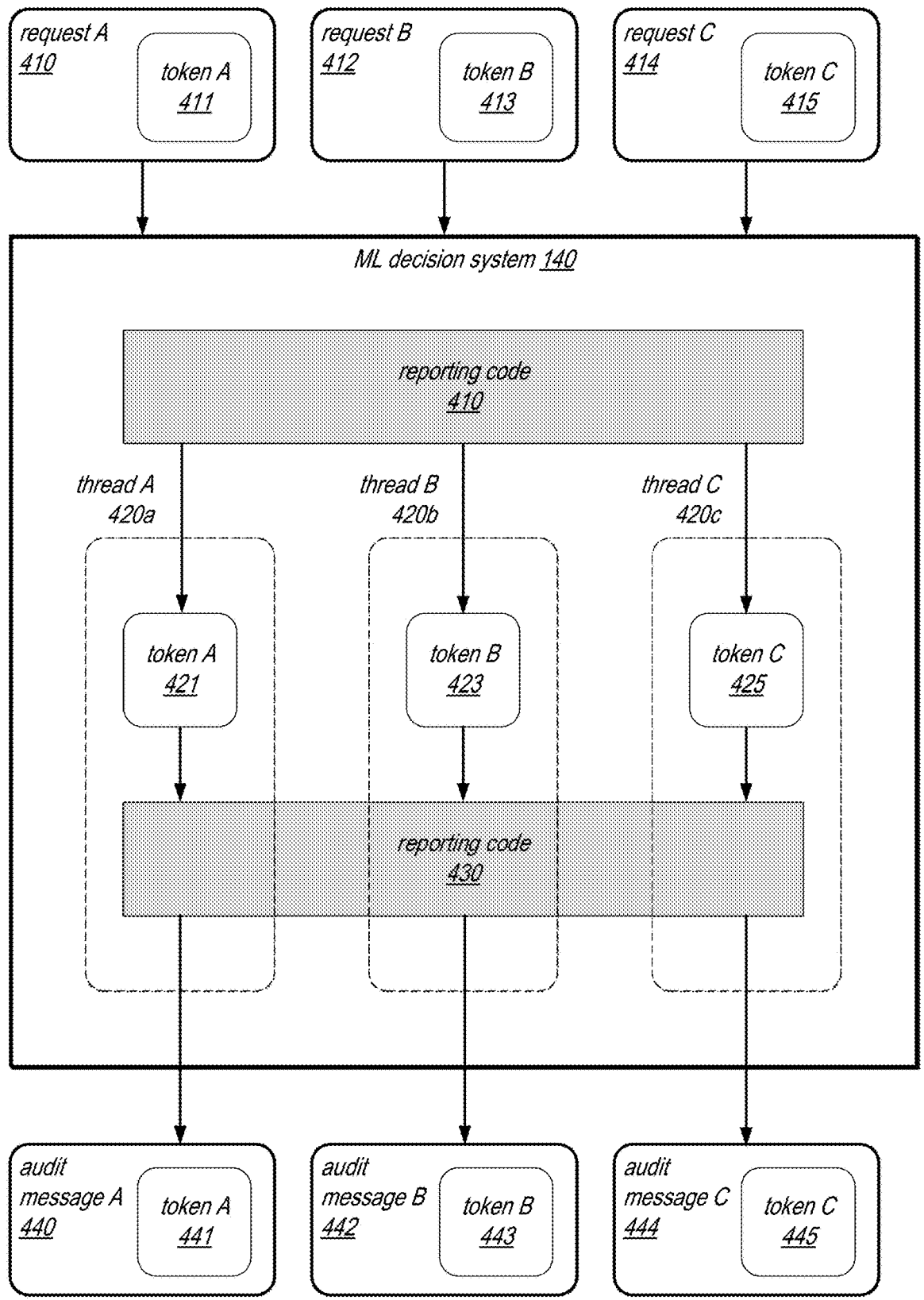
FIG. 4 is a block diagram illustrating example behavior of inserted reporting code that can operate in a multithreaded machine learning decision system, according to some embodiments.

FIG. 4 is a block diagram illustrating example behavior of inserted reporting code that can operate in a multithreaded machine learning decision system, according to some embodiments.

In some embodiments, the ML decision system 140 may be a multi-threaded application, as shown. For example, certain execution systems such as the Java™ runtime environment may allow applications to implement multiple threads, such as threads 420, as shown. In some embodiments, requests such as request A 410, B 412, and C 414 may be executed at least partly in separate threads. In some embodiments, such multi-threaded applications may reduce resource contention during certain stages of request handling, and allow the requests to be handled more quickly.

As shown, in some embodiments, each request A, B, and C may have its own obfuscated token A 411, B 413, and C 415. As discussed, in some embodiments, the obfuscation token may be used as a client identifier or request identifier, and it may be provided back to the auditing service in the audit messages A 440, B 442, and C 445. Accordingly, multi-threaded applications may implement functionality to ensure that the reporting code 430 that generates the audit messages 440, 442, and 444 is aware of the different tokens that it is handling.

In some embodiments, this disambiguation may be achieved by storing the different tokens in a data structure in the global memory of the execution system. For example, in some embodiments, each different token may be stored in a global table that associates the token with a thread ID. Accordingly, the reporting code 430 may look up the correct token based on the current thread ID.

In some embodiments, the tokens 421, 423, and 425 may be stored in a data structure that is local to each thread, for example, via a reporting code segment 410. In some embodiments, the execution system allows the application to define thread-local data whose scope is limited to a particular thread. In some embodiments, the reporting code 410 may store the tokens 421, 423, and 425 as thread-local data, so that a separate instance of the token data will be allocated for each thread. Accordingly, the reporting code 430 can retrieve the correct token 421, 423, and 425 when it is generating the audit messages, as shown.

Figure 5:
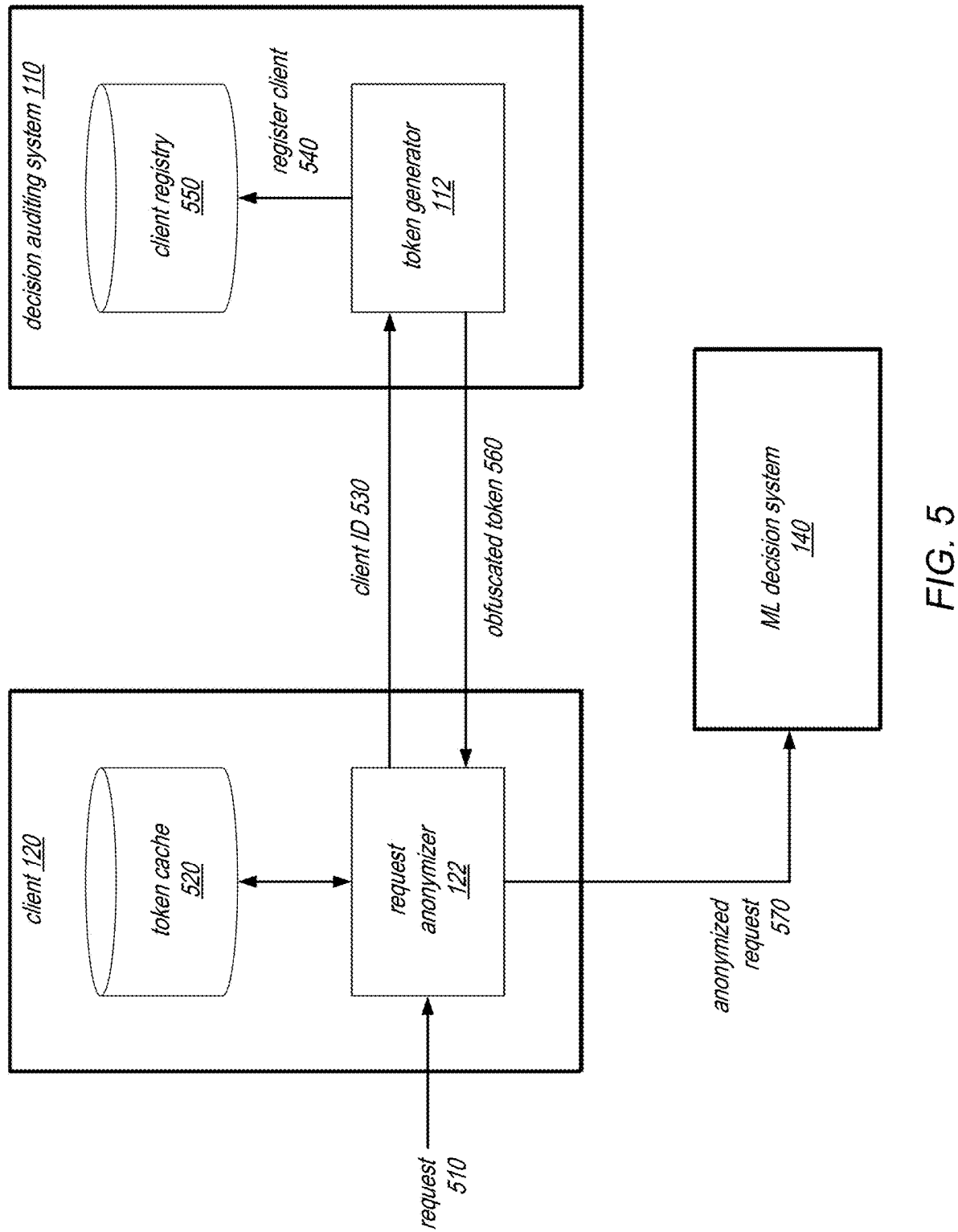
FIG. 5 illustrates a process where a client of the machine learning decision system obtains an obfuscated token from the decision auditing system to anonymize client requests, according to some embodiments.

FIG. 5 illustrates a process where a client of the machine learning decision system obtains an obfuscated token from the decision auditing system to anonymize client requests, according to some embodiments.

As discussed, in some embodiments, the client 120 may anonymize its requests (e.g. request 570) to the ML decision system 140 using an obfuscated token (e.g., token 560). In some embodiments, this anonymization eliminates one type of bias that may exist within the ML decision system, which may be based on the identity of the client. With the request anonymization feature, a client can audit the decision system without such bias, or perform experiments to detect any such bias.

In some embodiments, as discussed, the obfuscated token 560 may be obtained from the decision auditing system 110. For example, in some embodiments, the client 120 may receive a request 510 to be anonymized. In response, the client may send, via its request anonymizer 122, a request for an obfuscated token. The request may specify the client ID 530 of the client. In some embodiments, the request may specify a generated seed value, which may correspond to a request session, a request identifier, or a request timestamp.

In some embodiments, the token generator 112 may take the client ID 530 and use that to generate the obfuscated token 560. For example, in some embodiments, a hash function may be used to hash the client ID 530 into a hash value. In some embodiments, an encryption key may be used to encrypt the client ID. In some embodiments, the token may also be generated based on a sequence number or a timestamp generated at the decision auditing system 110. In some embodiments, the token generation process may be kept secret so that it cannot be readily predicted by an outside actor, such as the ML decision system.

In some embodiments, the submission of the client ID 530 to the auditing system may comprise a registration request for an audit session. Thus, in response, the auditing system may register 540 the client ID, along with other metadata about the client, in a client registry 550. In some embodiments, the client registry 550 may be checked when audit information is later received, so that only audit information for a registered client or audit session are logged by the decision auditing system. In some embodiments, later request to view the logged auditing information may also need to specify the client ID 530 or the obfuscated token 560.

In some embodiments, the client 120 may implement a token cache 520, as shown. In some embodiments, a particular obfuscation token may be reused by the client to issue multiple anonymized requests 570. For example, in some embodiments, multiple requests may be grouped together in a single audit session, which is associated with a single token. In some embodiments, the client 120 may repeatedly generate its own encrypted client or request identifier, based on an obfuscated token that is recycled periodically. In some embodiments, when a new request 510 is received at the client, the client may first check if an obfuscated token already exists in the token cache 520. If so, the cached token may be used to generate the anonymized request 570. If not, or if the cached token has expired, the client may request the token from the decision auditing system and refresh the token. Accordingly, in some cases, the depicted interaction between the client and the decision auditing system does not need to occur for every request 510, so that the auditing process can be performed more quickly.

Figure 6:
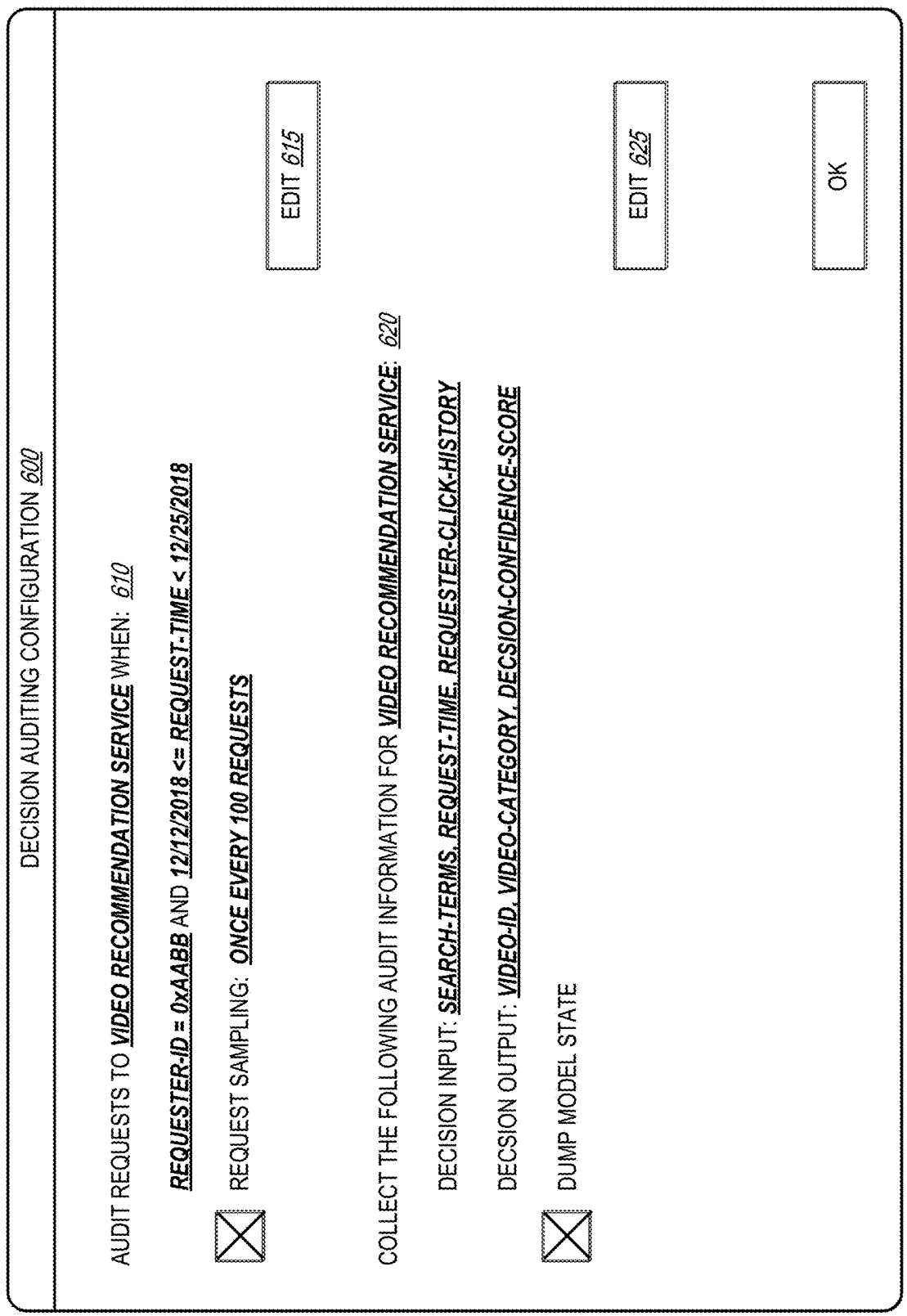
FIG. 6 illustrates a graphical user interface that is used to configure the auditing of a machine learning decision system, according to some embodiments.

FIG. 6 illustrates a graphical user interface that is used to configure the auditing of a machine learning decision system, according to some embodiments.

In some embodiments, different aspects the collection of audit information may be configured via a configuration interface, such as the decision auditing configuration interface 600. In some embodiments, the configuration information specified via interface 600 may be used to configure the ML decision system directly, for example, by configuring the inserted reporting code in the ML decision system via one or more exposed configuration settings. In some embodiments, the configuration may be performed by the administrators of the decision auditing system or service. For example, clients of the decision system may request that auditing be turned on for a particular group of decision requests to the decision system, and the administrators or operators of the decision auditing system may use an interface such as configuration interface 600 to enable auditing for the specified requests. In some embodiments, the configuration information may be provided by the client. In some embodiments, the configuration may be specified by the client, without the use of decision auditing service. For example, in some embodiments, the configuration parameters may be included as control parameters in the client request. The configuration parameters may be observed by the reporting code.

As shown, in some embodiments, the configuration information may be specified for different ML decisions systems. In the depicted example, the audit information collection of a video recommendation service is being configured. As shown in section 610, different auditing or reporting conditions may be specified for when audit information is collected. In this example, audit information is to be collected for a particular requester (specified by a requester ID), and during a period of time. The decision auditing system may then execute according to the specified auditing or reporting conditions, which may be enforced via the inserted reporting code. In this manner, auditing may be limited in scope, so that system performance is not unduly impacted. In some embodiments, the types of auditing or reporting conditions that may be specified via the interface 600 may vary depending on the particular ML decision system or service involved. In some embodiments, the auditing or reporting conditions may be specified by the client, for example, via control parameters included in individual requests to the decision system.

As shown, another configuration setting may allow the user to specify a request sampling rate. In some embodiments where decision requests are received at a high rate, the sampling configuration may allow the system to only audit a small sample of requests. Again, this configuration may be used to improve the performance of the decision system during auditing. It should be noted that in some embodiments, the sending of the audit message may be performed asynchronously from the actual handling of the request. Thus, the auditing functionality will not add excessively to the request latency. The edit button 615 may be used to change the configuration settings under section 610.

As shown, section 620 includes configuration settings regarding which types of data to collect during the audit, which may be added to one or more audit messages. In some embodiments, the parameters under this section 620 may vary depending on the application or even the reporting code location. In some embodiments, the decision auditing configuration interface 600 may be driven by an application-specific specification provided by the auditing team that implemented the reporting code instrumentation. As shown, in this example, the auditing information to be collected include certain types of input to the decision system, such input search terms, the request time, and the requester's recent click history. In some embodiments, the ML decision system may maintain certain context data about a requestor, and use that information to make its decisions. Also in this example, the reporting code is configured to collect output data such as the ID of the video selected, the category of the selected video, and a decision confidence score which may be an internal score generated by the ML model for its selection. Additionally, as shown, the reporting code may be configured to dump model state, which may include the various model state variables in the ML model at the time of its decision, for example, the results of any sub-decisions, etc. The edit button 625 may be used to change the configuration settings under section 620. In some embodiments, these control parameters may be specified via client requests. For example, an individual client request may include control parameters for that request that specify a subset of internal decision data to be collected and logged. In some embodiments, the client may receive documentation about auditing instrumentation included in a decision system and use the documentation to specify the control parameters.

Figure 7:
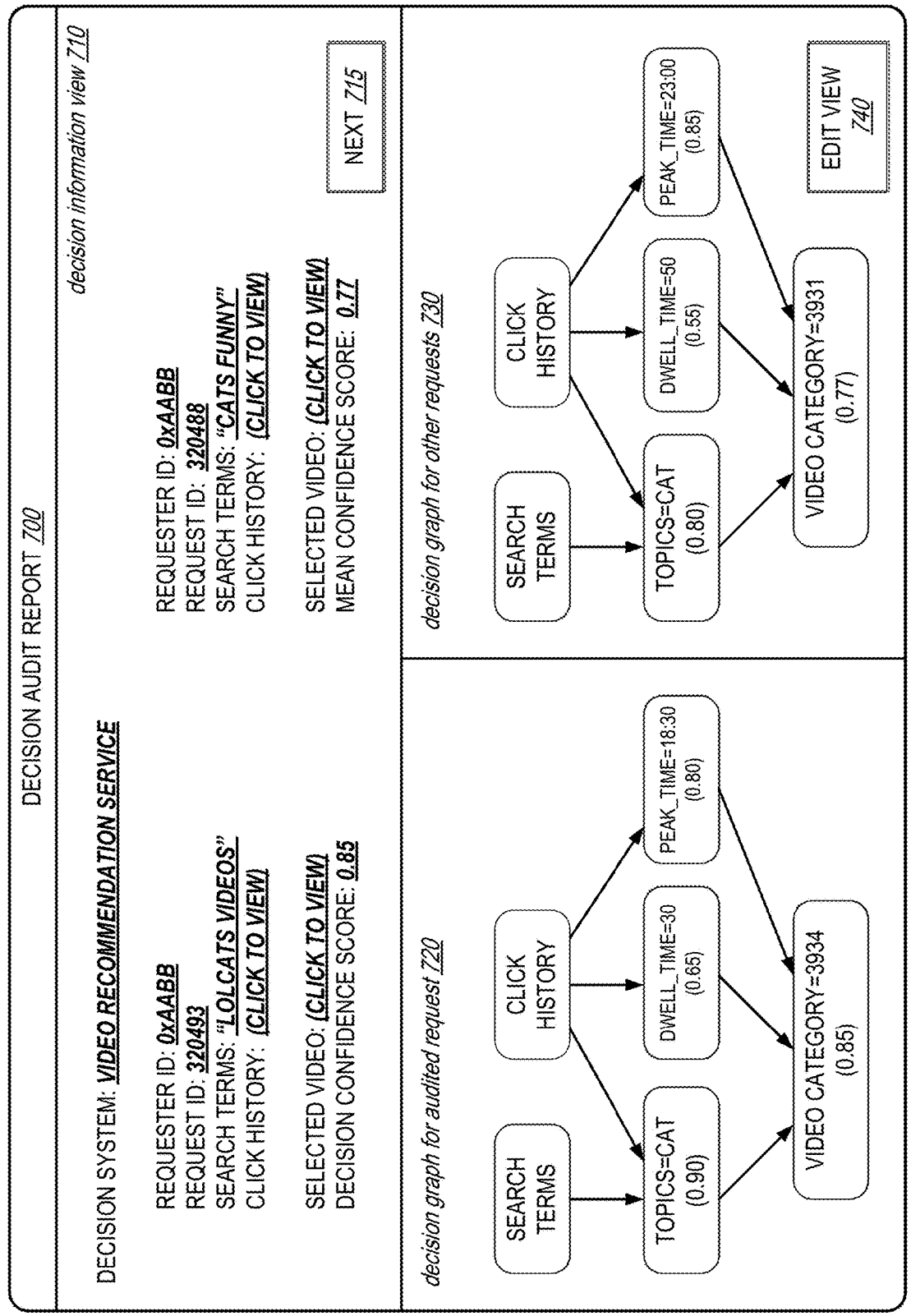
FIG. 7 illustrates a graphical user interface that displays audit results of a machine learning decision system, according to some embodiments.

FIG. 7 illustrates a graphical user interface that displays audit results of a machine learning decision system, according to some embodiments.

In some embodiments, the results of an audit may be compiled and presented for display to a user via a GUI, such as for example, the decision audit report interface 700 shown. In some embodiments, the interface 700 may be generated as a webpage by one or more components of the decisions auditing system or service, such as for example the audit report generator 134 of FIG. 1. In some embodiments, raw results captured from the audit messages may be provided to the client, and the client may perform the compilation of the raw results to generate the interface 700.

As shown, in the example interface 700, a decision information view 710 is used to display the decision audit information for one request, which generated one decision. In this example, the request causes ML decision system to recommend a video. The decision information view 710 displays the collected audit information provided in the audit messages, for example, the search terms for videos specified in the request. The view also specifies other contextual information that was used during the decision process, such as the requester's recent click history. In this example, the user may click on the "click to view" link to see the requester's click history at the time of the decision. Additionally, the view 710 also shows the output decision of the ML decision system. Here, the output is a selected video, which the user may view by clicking on the link. Moreover, the view 710 indicates a decision confidence score, which may be provided by the ML decision model indicating a confidence level of its decision.

In addition, the decision information view 710 also displays the decision information for another request, here from the same requester. The view 710 here presents the information for the two requests side-by-side, so that the decision audit data for the two decisions may be easily compared. In this example, the next button 715 allows the user to cycle through a number of related requests to compare with the request in question on the left-hand side. In some embodiments, the set of comparison requests may be specified via one or more filtering conditions, and may include anonymized data from requests issued by other requesters.

As shown, the interface 700 additionally includes two decisions graphs 720 and 730. The decision graph 720 corresponds to the decision for the left-hand side request, and the decision graph 730 corresponds to the decision for the right-hand side (comparison) request. As shown, in this example, the decision process is separated into a number of decision steps, to more clearly show how the decision system arrived as its ultimate decision. Depending on the embodiment, the decision system and the reporting code may be configured to provide information that allows the decision graph to be constructed. For example, audit information for each of the sub-decisions shown in the decision graph may be obtained from a reporting code segment inserted at a particular location in the decision system, and then labeled with a semantically meaningful label to be displayed in the interface. In this example, the input information such as search terms and click history are shown at the top. One level below, the results of three sub-decisions are provided. In some embodiments, the user may click on each sub-decision element to see more information about the sub-decision. Additionally, as shown, a confidence score for each sub-decision is shown. Finally, at the bottom level, the video category of the ultimately selected video is provided. In this example, the edit view button 740 may allow the user to modify the presentation of the decision trees 720 and 730, for example, to change the displayed parameters or add or remove sub-decision elements in the decision trees.

In some embodiments, the interface 700 may include a call graph that indicates one or more internal functions calls made in the decision system to arrive at the ultimate decision. In some embodiments, the nodes of the call graph may include functions or modules in the decision system, and the edges in the call graph may indicate one or more calls from a calling function or module to a called function or module. In some embodiments, the call graph may also indicate input and output parameters associated with the different calls. In some embodiments, the call graph may also indicate other metadata, such as the duration of time used by a function or module to return a result, or memory or storage reads or writes performed by a function or module, etc. In some embodiments, such information may be gathered by the reporting code and logged as part of the audit information for the decision system.

As may be understood, an interface such as interface 700 may be generated from the collected audit information to allow a user to see the internal data used by a ML decision system to arrive at a decision. The GUI allows users to easily see the factors behind a particular decision and detect any hidden or unexpected biases that are present in the ML decision system. Accordingly, the GUI allows users to perform various experiments to audit the ML decision system, even though the logic of the ML decision system cannot be readily interpreted by humans.

FIG. 7 illustrates a graphical user interface that displays audit results of a machine learning decision system, according to some embodiments.

Figure 8:
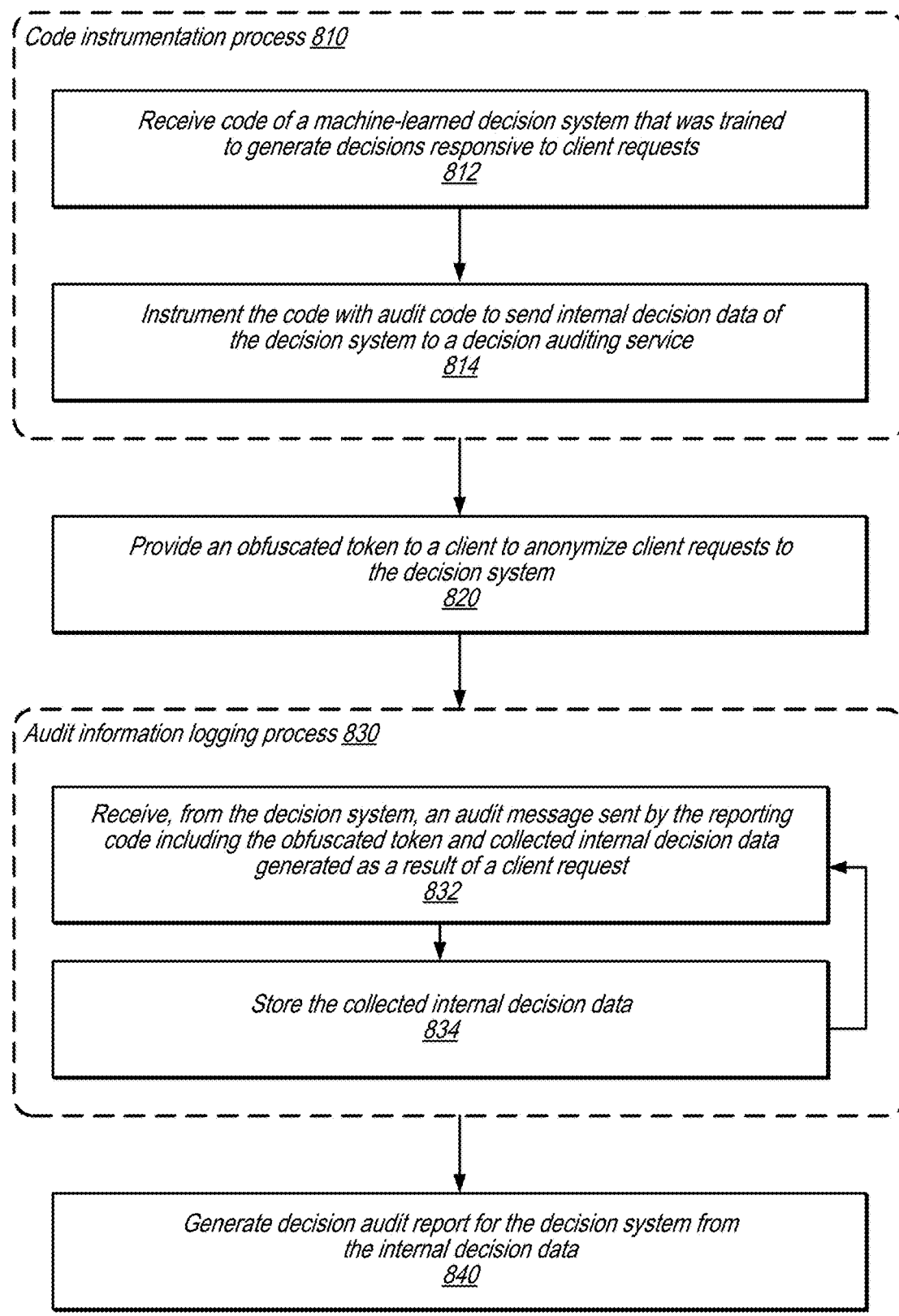
FIG. 8 is a flow diagram illustrating a process of instrumenting a machine learning decision system for audit and then collecting and providing audit information from the machine learning decision system, according to some embodiments.

FIG. 8 is a flow diagram illustrating a process of instrumenting a machine learning decision system for audit and then collecting and providing audit information from the machine learning decision system, according to some embodiments.

FIG. 8 is a flow diagram illustrating a process of instrumenting a machine learning decision system for audit and then collecting and providing audit information from the machine learning decision system, according to some embodiments.

As shown, the process begins with a code instrumentation process 810. In some embodiments, the code instrumentation process may be performed by, for example, the code instrumentation system 310 of FIG. 3. In some embodiments, the instrumentation process may be performed by an audit team that is separate from the development team that developed the ML decision system, so that the auditing process will not be biased by the development team.

At operation 812, application code of a ML decision system is received. The ML decision system may be trained using a machine learning process to generate decisions responsive to client requests. In some embodiments, the generated decision may be returned to the client, while in some embodiments, the decision may only be used to perform a requested task. In some embodiments, the ML decision system may include application code that are used to invoke and interface with the ML model. The application code may be in a compiled form, such as for example a form of intermediate or executable code. For example, the application code may comprise Java™ byte code.

At operation 814, the application code is instrumented with reporting code to report or send internal decision data of the ML decision system to a decision auditing service. In some embodiments, the code instrumentation system may programmatically parse the application code, and identify one or more reporting code insertion locations. For example, in some embodiments, inbound functions, outbound functions, or model interfacing functions may be identified for instrumentation. In some embodiments, the reporting code may collect data such as function input and output parameters, model input and output parameters, or other execution state parameters used during the decision-making process of the ML decision system. The reporting code may package this audit information into audit messages, which are sent to the decision auditing system or service. In some embodiments, the instrumentation process may be performed in part as a manual process. In some embodiments, the instrumentation process may be informed by information provided by the development team of the ML decision model.

At operation 820, an obfuscated token is provided to a client of the ML decision system, which may be used to anonymize client requests sent to the decision system. Depending on the embodiment, operation 820 may be performed by the decision auditing system or the code instrumentation system. In some embodiments, the obfuscated token may be generated based on a client identifier or a request identifier, which may be provided by the client. In some embodiments, the obfuscated token may be generated based on a timestamp at the time of generation. In some embodiments, the token may be used in place of a client identifier or request identifier in client requests to the decision system, so that the decision system never obtains the actual client ID or request ID. In this manner, the decision system's decision cannot be influenced by the client ID or request ID.

As shown, operations 832 and 834 are performed as part of an audit information logging process 830. In some embodiments, the logging process 830 may be performed by for example the decision auditing system 110 of FIG. 1 or the decision auditing service 260 of FIG. 2. In some embodiments, the decision auditing system or service may be executed separately or managed by a separate entity as the ML decision system. In some embodiments, the decision auditing system or service may be executed as a service in a service provider network, possibly as part of a machine learning service, as discussed in connection with FIG. 2.

At operation 832, an audit message is received from the ML decision system. The audit message may be one of many audit messages generated or sent by the reporting code inserted into the ML decision system. In some embodiments, the audit message may include metadata such as the obfuscated token provided in operation 820, a message source ID corresponding to the decision system or the reporting code segment, and/or a message timestamp. In some embodiments, the audit message may also include other collected internal decision data generated by the ML decision system as a result of a client request to the decision system.

At operation 834, the collected internal decision data from the audit message is stored. In some embodiments, the contents of the audit message may be stored in an audit log repository (e.g. audit log 132), which may store audit information for later retrieval or analysis. In some embodiments, the stored audit information may be stored according to a client identifier, which may be determined based on the obfuscated token.

At operation 840, an audit report for the ML decision system is generated from the collected internal decision data. The audit report may include the collected internal decision data included in the audit message, as well as collected internal decision data included in other audit messages. In some embodiments, the audit report may be provided via an audit report generator (e.g. report generator 134 of FIG. 1). In some embodiments, the audit report generator may generate a GUI or some other interface to present the audit information to a client. In some embodiments, the audit information may include both collected information and other interpretative results derived from the collected information. In some embodiments, the GUI may present a comparison view that compares the audit information of two or more different requests or groups of requests. In some embodiments, the GUI may also present a decision tree that displays the results and data for a number of decision steps or sub-decisions associated with a particular client request. An example of such a decision graph may be seen in for example FIG. 7. The audit report GUI allows users to easily view and understand the factors and reasons behind the ML decision system's ultimate decision. For example, the decision audit report GUI 700 may be used to view the results of different model experiments using different test requests and to easily detect hidden biases within the ML decision system.

Figure 9:
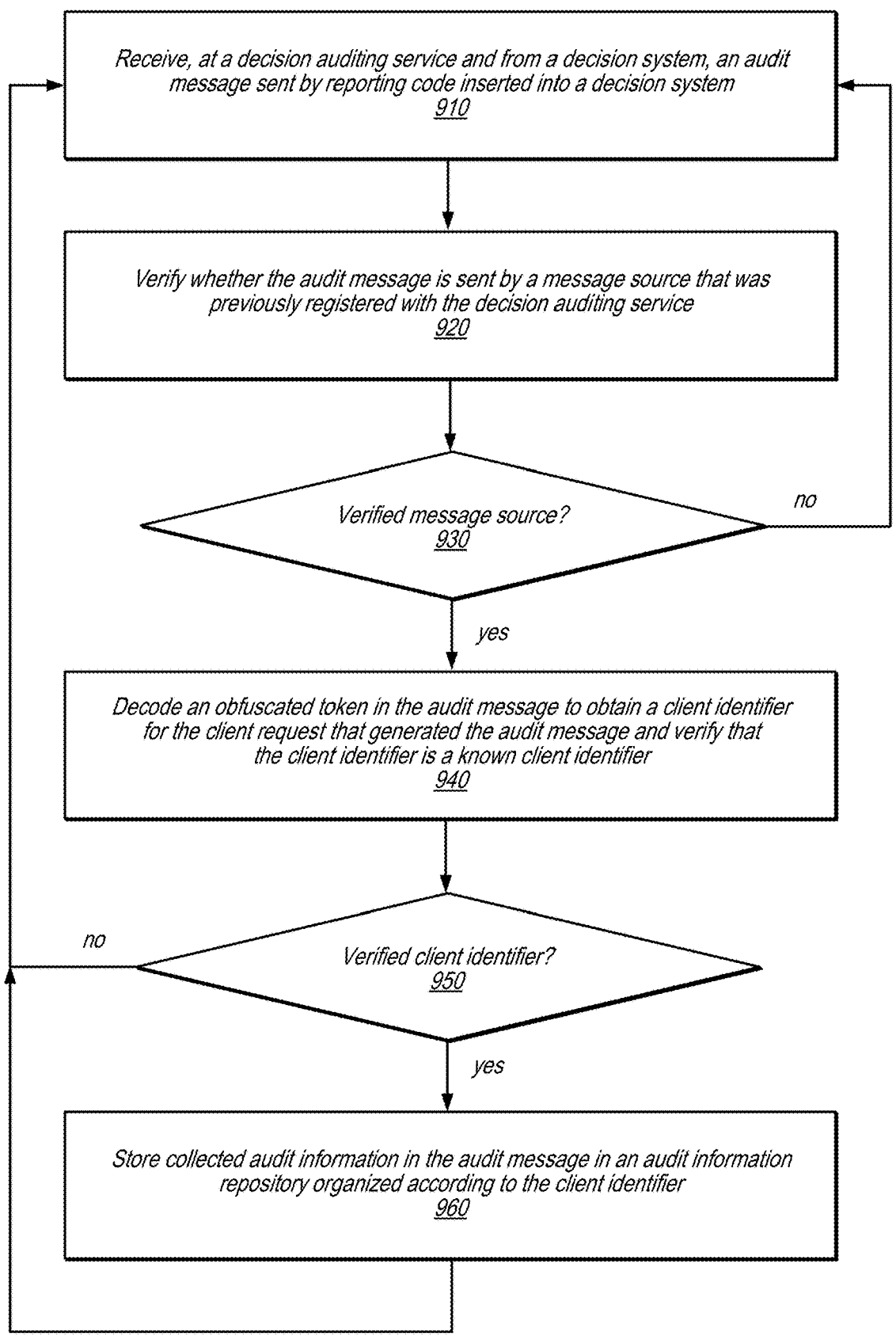
FIG. 9 is a flow diagram illustrating a process of storing audit information received at a decision auditing service, according to some embodiments.

FIG. 9 is a flow diagram illustrating a process of storing audit information received at a decision auditing service, according to some embodiments. In some embodiments, the depicted process may be performed by a decision auditing system (e.g. decision auditing system 110) or a decision auditing service (e.g., decision auditing service 260), as discussed herein. In some embodiments, the operations shown may be performed as part of the audit information logging process 830 of FIG. 8.

At operation 910, an audit message from a ML decision is received at a decision auditing system or service. As discussed, the auditing message may be generated by reporting code inserted into the decision system, and contain internal decision data collected by the reporting code.

At operation 920, a verification is performed whether the audit message was sent by (or generated by) a message source that was previously registered with the decision auditing system or service. In some embodiments, the registration of a message source may be performed when or after the ML decision system is instrumented to communicate with the decision auditing system. In some embodiments, each different reporting code segment that can generate an audit message may be associated with a different message source identifier, which may be compared to registered source identifiers stored in a message source registry (e.g. registry 264) at the decision auditing system or service. As shown in operation 930, if this verification operation fails, the decision auditing system or service may simply ignore the incoming audit message. If the message source is verified, the process proceeds to the next operation 940.

At operation 940, an obfuscated token in the audit message is decoded to obtain a client identifier for the client request that generated the audit message. For example, the obfuscated token may be token 115 of FIG. 1 or token 560 of FIG. 5. As discussed, in some embodiments, the audit message may include the obfuscated token, which may correspond to a client or a particular request, so that the auditing system or service can determine which client or request is responsible for generating the audit message. However, because the token is obfuscated, the decision system itself never learns the actual identity of the client. In some embodiments, the decoding may be performed by applying a hash function or a decryption function to obtain the client identifier from the token. In some embodiments, the decoding may be performed using a lookup table that maps tokens to clients. In some embodiments, all clients that have requested an obfuscated token from the auditing system or service are persisted, for example in a repository such as the client registry 550, and individual audit messages are checked to verify that its obfuscated token matches a client known to the auditing system or service. As shown in operation 950, if the obfuscated token or client identifier cannot be verified, the audit message may be simply ignored, and the process proceeds back to operation 910 to process the next audit message. Otherwise, the process proceeds to operation 960.

At operation 960, collected information in the audit message is stored in an audit information repository organized according to the client identifier. In some embodiments, the client identifier may not be decoded, and the audit information may be stored with the obfuscated token. In some embodiments, the audit information may be stored in an audit log or an audit log repository, such as repository 132 of FIG. 1. As discussed, the audit log repository may be implemented as any suitable storage, such as a file, a group of files, a database, or the like. In some embodiments, the audit information may be organized by the client identifier, for example, in a table that uses the client identifier as a primary or search key. In some embodiments, all audit information about a particular request or a particular client may be easily queried from the audit information repository to generate an audit report about that particular request or client. In some embodiments, stored audit information may be periodically deleted after passage of a certain amount of time, to keep the storage utilization of the auditing service to a low level.

Figure 10:
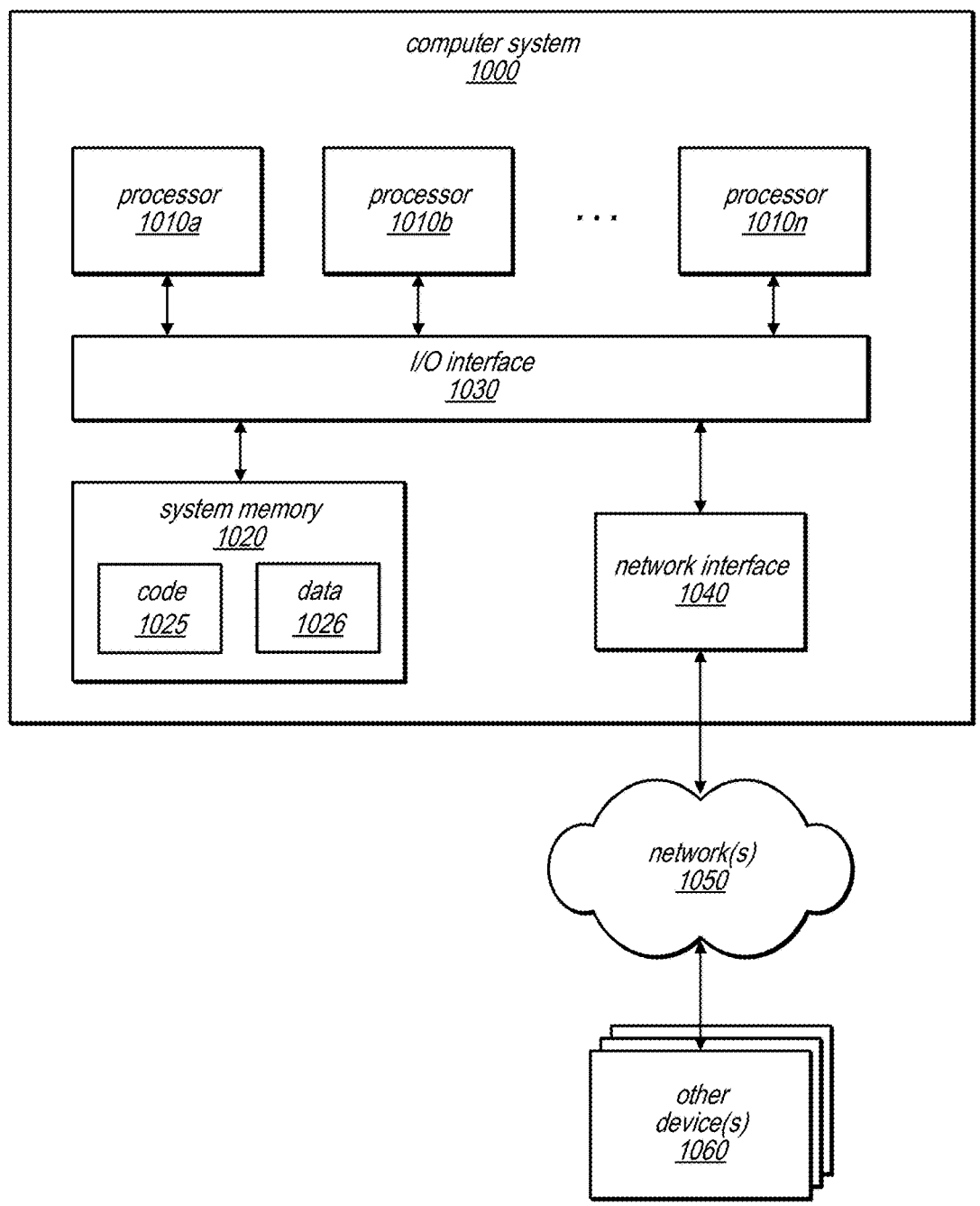
FIG. 10 is a block diagram illustrating an example computer system that can be used to implement a decision auditing system for machine learning decision systems or a code instrumentation system for machine learning decision systems, according to some embodiments.

FIG. 10 is a block diagram illustrating an example computer system that can be used to implement a decision auditing system for machine learning decision systems or a code instrumentation system for machine learning decision systems, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1026. The system memory 1020 may include different levels of cache, some of which may be located on the CPU and some away from the CPU. One level of the cache hierarchy may be a last level cache that is shared by all of the processors 1010a to 1010n. The last level cache may be an inclusive cache of the low levels of cache in the cache hierarchy.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
one or more computers that implement a machine-learned (ML) decision system configured with computer-executable code to generate decisions in response to client requests, wherein the ML decision system is instrumented with reporting code executable to report internal decision data of the ML decision system to a decision auditing service in one or more audit messages;
one or more computers that implement the decision auditing service, configured with computer-executable code to execute separately from the ML decision system to:
provide, to a plurality of clients, respective obfuscated tokens to be included in respective client requests of the plurality of clients to the ML decision system, wherein the obfuscated tokens anonymize the client requests to the ML decision system so that no client-identifying information is made available to the ML decision system with the client requests;
receive, from the ML decision system, a plurality of audit messages sent by the reporting code that include the obfuscated tokens and internal decision data generated as a result of respective client requests;
decode the obfuscated tokens in the audit messages to obtain respective client identifiers;
store the internal decision data in an audit data repository organized according to client identifiers; and
perform an audit of the ML decision system based at least in part on the internal decision data to generate an audit report of the ML decision system.

2. The system of claim 1, wherein the decision auditing service is configured to execute in a provider network accessible by the plurality of clients via a public network, and the ML decision system is configured to execute in a machine learning service hosted by the provider network.

3. The system of claim 1, wherein the decision auditing service is configured to:
provide a client library to a particular client, wherein the client library is configured to send a token request to obtain an obfuscated token from the decision audit service; and
generate and provide the obfuscated token in response to a token request from the client library.

4. The system of claim 1, wherein the ML decision system includes a machine learning model, and the reporting code, when executed, causes the ML decision system to collect and send one or more of: one or more input parameters to the machine learning model, one or more output parameters of the machine learning model, and one or more model state parameters of the machine learning model.

5. The system of claim 1, wherein to generate the audit report, the decision auditing service is configured to:
generate a graphical user interface that compares respective decision graphs for two or more client request, wherein individual ones of the decision graphs indicate a plurality of decision steps performed by the ML decision system for individual ones of the two or more client requests, and wherein the decision graphs are generated from the internal decision data for the individual client requests.

6. A method comprising:
performing, via decision auditing service implemented using one or more computers:
providing, to a plurality of clients, respective obfuscated tokens to be included in respective client requests of the plurality of clients to a machine learned (ML) decision system, wherein the obfuscated tokens anonymize the client requests to the ML decision system so that no client-identifying information is made available to the ML decision system with the client requests;
receiving, from the ML decision system, a plurality of audit messages sent by reporting code instrumented in the ML decision system, wherein the reporting code is configured to send internal decision data of the ML decision system as one or more audit messages;
decoding the obfuscated tokens in the audit messages to obtain respective client identifiers;
storing the internal decision data in an audit data repository organized according to client identifiers; and
performing an audit of the ML decision system based at least in part on the internal decision data to generate an audit report of the ML decision system.

7. The method of claim 6, further comprising:
executing the decision auditing service in a provider network accessible by the plurality of clients via a public network; and
executing the ML decision system in the provider network.

8. The method of claim 6, wherein the ML decision system includes a machine learning model, and the reporting code, when executed, causes the ML decision system to collect and send one or more of: one or more input parameters to the machine learning model, one or more output parameters of the machine learning model, or one or more model state parameters of the machine learning model.

9. The method of claim 6, further comprising:
receiving a first and a second audit message from the ML decision system, wherein the first and second audit messages include respective timestamps; and
wherein performing the audit includes computing a time duration from the respective timestamps of the first and second audit messages.

10. The method of claim 6, further comprising:
prior to receiving the audit messages, instrumenting code of the ML decision system, including:
determining in the code one or more inbound or outbound functions in the ML decision system; and
inserting one or more reporting code segment in the one or more inbound or outbound functions.

11. The method of claim 10, wherein:
the ML decision system is a multi-threaded application configured to execute a function for multiple client requests in parallel in respective threads; and
the reporting code when executed causes the ML decision system to store respective request identifiers for the multiple client requests in the respective threads, wherein the respective request identifiers include respective obfuscated tokens.

12. The method of claim 6, further comprising performing, by the decision auditing service:

providing a client library to a particular client, wherein the client library is configured to send a token request to obtain an obfuscated token from the decision audit service; and generating the obfuscated token in response to a token request from the client library.

13. The method of claim 12, wherein:

the token request specifies a client identifier of the client; and the generation of the obfuscated token is based at least in part on the client identifier and a timestamp.

14. The method of claim 6, further comprising performing, by the decision auditing service:

registering the reporting code at the decision auditing service as one or more message sources, wherein the decision auditing service is configured to register reporting code inserted in a plurality of different ML decision systems; and prior to storing the audit message, verifying that the audit message is sent by a message source that was registered at the decision auditing service.

15. The method of claim 6, further comprising performing, by the ML decision system:

receiving a particular client request from a particular client, wherein the client request includes one or more control parameters indicating a subset of the internal decision data to be reported; and executing the reporting code in the ML decision system to report the subset of the internal decision data in accordance with the one or more control parameters.

16. The method of claim 6, further comprising performing, by the ML decision system:

receiving configuration information specifying one or more reporting conditions under which internal decision data is to be collected; and executing the reporting code for different client requests in accordance with the reporting conditions specified in the configuration information.

17. The method of claim 6, wherein generating the audit report comprises:

generating a graphical user interface that compares the internal decision data with other internal decision data collected for one or more other client requests.

18. The method of claim 6, wherein generating the audit report comprises:

generating a graphical user interface that displays a decision graph indicating a plurality of decision steps performed by the ML decision system for a particular client request, wherein the decision graph is generated from the internal decision data.

19. One or more non-transitory computer-accessible storage media storing program instructions that when executed on or across one or more processors of a decision auditing service, cause the decision auditing service to:

provide, to a plurality of clients, respective obfuscated tokens to be included in respective client requests of the plurality of clients to a machine learned (ML) decision system, wherein the obfuscated tokens anonymize the client requests to the ML decision system so that no client-identifying information is made available to the ML decision system with the client requests;

receive, from the ML decision system, a plurality of audit messages sent by reporting code instrumented in the ML decision system, wherein the reporting code is configured to send internal decision data of the ML decision system as one or more audit messages;

decode the obfuscated tokens in the audit messages to obtain respective client identifiers;

store the internal decision data in an audit data repository organized according to client identifiers; and perform an audit of the ML decision system based at least in part on the internal decision data to generate an audit report of the ML decision system.

20. The one or more non-transitory computer-accessible storage media of claim 19, wherein the program instructions when executed on or across the one or more processors cause the decision auditing service to:

provide a client library to a particular client, wherein the client library is configured to send a token request to obtain an obfuscated token from the decision audit service; and generate and provide the obfuscated token in response to a token request from the client library.

* * * * *